(12) United States Patent
Plevyak et al.

(10) Patent No.: US 9,690,842 B2
(45) Date of Patent: *Jun. 27, 2017

(54) ANALYZING FREQUENTLY OCCURRING DATA ITEMS

(71) Applicant: Google Inc., Mountain View, CA (US)

(72) Inventors: John Plevyak, Mountain View, CA (US); Amit Kumar Manjhi, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,439

(22) Filed: Nov. 9, 2015

(65) Prior Publication Data

US 2016/0063090 A1 Mar. 3, 2016

Related U.S. Application Data

(63) Continuation of application No. 14/221,786, filed on Mar. 21, 2014, now Pat. No. 9,183,242, which is a continuation of application No. 13/528,614, filed on Jun. 20, 2012, now Pat. No. 8,682,864.

(51) Int. Cl.
*G06F 17/30* (2006.01)

(52) U.S. Cl.
CPC .... *G06F 17/30598* (2013.01); *G06F 17/3033* (2013.01); *G06F 17/30327* (2013.01); *G06F 17/30377* (2013.01); *G06F 17/30979* (2013.01)

(58) Field of Classification Search
None
See application file for complete search history.

(56) References Cited

U.S. PATENT DOCUMENTS

| | | | |
|---|---|---|---|
| 6,665,669 B2 * | 12/2003 | Han | G06F 17/30327 |
| 7,739,225 B2 | 6/2010 | Loftus et al. | |
| 8,135,718 B1 * | 3/2012 | Das | G06F 17/30979 707/748 |
| 8,244,666 B2 | 8/2012 | Loftus et al. | |

(Continued)

OTHER PUBLICATIONS

Demaine, E. et al., "Frequency estimation of interne packet streams with limited space," Proceedings of the 10th Annual European Symposium on Algorithms, Springer-Verlag, pp. 348-360, 2002.

*Primary Examiner* — Debbie Le
(74) *Attorney, Agent, or Firm* — Fish & Richardson P.C.

(57) ABSTRACT

Methods, systems, and computer program products for determining frequently occurring data items are disclosed. These include, counting distinct categories of a plurality of data items using an ordered set of counters, wherein each of the counters is associated with one of the distinct categories and represents a quantity of the data items in the associated one of the distinct categories, and wherein the counting includes updating counters in the ordered set and a global decrement counter when one of the data items fails to match at least one of the distinct categories associated with the counters of the ordered set and when the ordered set is full. These further include, reporting, for each of the counters in the ordered set, a lower bound for the associated one of the distinct categories, wherein the lower bound is based upon a value of the counter and the global decrement counter.

20 Claims, 5 Drawing Sheets

(56) References Cited

U.S. PATENT DOCUMENTS

| | | | |
|---|---|---|---|
| 8,290,991 B2 * | 10/2012 | Kahn | G06F 17/30997 707/687 |
| 8,380,698 B2 | 2/2013 | Sundaranatha | |
| 8,682,864 B1 | 3/2014 | Plevyak et al. | |
| 8,712,937 B1 * | 4/2014 | Bacus | G06F 17/30705 706/20 |
| 2003/0028531 A1 | 2/2003 | Han et al. | |
| 2007/0016581 A1 | 1/2007 | Inoue et al. | |
| 2010/0095162 A1 * | 4/2010 | Inakoshi | G06F 11/3409 714/45 |
| 2010/0250535 A1 | 9/2010 | Loftus et al. | |

* cited by examiner

ANALYZING FREQUENTLY OCCURRING DATA ITEMS

CROSS-REFERENCE TO RELATED APPLICATIONS

This application is a continuation application of and claims the benefit of priority to U.S. application Ser. No. 14/221,786, filed on Mar. 21, 2014, which is a continuation application of U.S. application Ser. No. 13/528,614, filed on Jun. 20, 2012.

BACKGROUND

Field

This disclosure relates to analyzing collections of data items.

Background

The analysis of large amounts of data items can consume excessive amounts of memory and processing power. Although a table can be used to determine how many times each unique value appears in a collection of data, the memory required to store the table and the processing delays associated with accessing and updating the table for a very large number of data items may be excessive.

A table of fixed size (or a variable size not to exceed a defined maximum) may be used for determining, from a data collection, the unique values with the highest frequencies of occurrence. Such a table can be used to maintain counts of the most frequent of the unique values, while ignoring the less frequent unique values. But, analyzing large collections of data items to determine the most frequently occurring data items (e.g., unique values) using a limited amount of memory can be a challenge. For example, a determination must be made as to which of an unknown number of different unique values are to be maintained in the table.

Some conventional techniques collect a predetermined number of item value and count pairs, and in order to maintain the table below a predetermined size, periodically sort the collected value-count pairs to discard a portion of the collected data that is below a threshold. The discarding of a portion of the collected value and count pairs may result in some item values that should have been considered as most frequent item values being lost based upon where in the stream of input those occurred. Therefore, such conventional techniques, although using reduced memory and processing power, may not be sufficiently accurate. Other conventional approaches have used priority queues to keep track of an approximation of the current most frequent elements, but fail to provide a realistic lower bound and upper bound in many situations. Moreover, these conventional techniques may not yield sufficiently reliable results when extended to distributed environments.

SUMMARY

Methods, systems, and computer program products for more accurately and efficiently determining most frequent data items are disclosed. These include, counting distinct categories of the data items using an ordered set of counters, wherein each of the counters is associated with one of the distinct categories and represents a quantity of the data items in the associated one of the distinct categories, and wherein the counting includes updating counters in the ordered set and a global decrement counter when one of the data items fails to match at least one of the distinct categories associated with the counters of the ordered set and when the ordered set is full. These further include, reporting, for each of the counters in the ordered set, a lower bound for the associated one of the distinct categories, wherein the lower bound is based upon at least a value of the counter and the global decrement counter.

Further features and advantages of the embodiments, as well as the structure and operation of various embodiments thereof, are described in detail below with reference to the accompanying drawings. It is noted that this disclosure is not limited to the specific embodiments described herein. Such embodiments are presented herein for illustrative purposes only. Additional embodiments will be apparent to persons skilled in the relevant art(s) based on the teachings contained in this disclosure.

BRIEF DESCRIPTION OF THE DRAWINGS/FIGURES

Reference will be made to embodiments, examples of which may be illustrated in the accompanying figures. These figures are intended to be illustrative, not limiting. Although the invention is generally described in the context of these embodiments, it should be understood that it is not intended to limit the scope of the disclosure to these particular embodiments.

DETAILED DESCRIPTION

While the disclosure refers to illustrative embodiments for particular applications, it should be understood that the disclosure is not limited thereto. Those skilled in the art with access to this disclosure will recognize additional modifications, applications, and embodiments within the scope of this disclosure and additional fields in which the disclosed examples could be applied.

Embodiments disclosed herein may be used to determine frequently occurring unique values in one or more data collections. In the disclosed embodiments, an ordered data structure or ordered set, such as, but not limited to, a table, list, or priority queue, of counters that is limited to a maximum size, may be used to maintain the number of occurrences of a plurality of most frequently occurring unique data items. Operations used upon the ordered set may include, insertion and removal of elements, counter increment, and counter decrement. According to some embodiments, another counter, referred to as the "global decrement counter," is maintained in addition to the ordered set, and the global decrement counter may be used in providing a lower bound and upper bound for the counter values in the ordered set. Another value referred to as the "insertion count" may be associated with at least some of the unique data items when they are inserted into the ordered set, and represents a minimum number of occurrences of that unique data item that may have occurred before it is inserted in the ordered set. The insertion count may be used in determining a lower bound for a data item.

Moreover, embodiments enable the distributed determination of the most frequent unique values. For example, each of a plurality of computing nodes may, on its own, determine the most frequent data items from respective portions of the data collection, and the separately determined sets of most frequent data items may subsequently be combined or merged. It should be noted that even the same set of distinct categories may have significantly varying ranking or priorities among the respective distinct categories when frequencies are evaluated in separate collections or separate portions of the same collection. Disclosed embodiments can combine results generated by a plurality of processing nodes and/or data collections to efficiently and accurately generate a combined list of most frequent data items.

Figure 1:
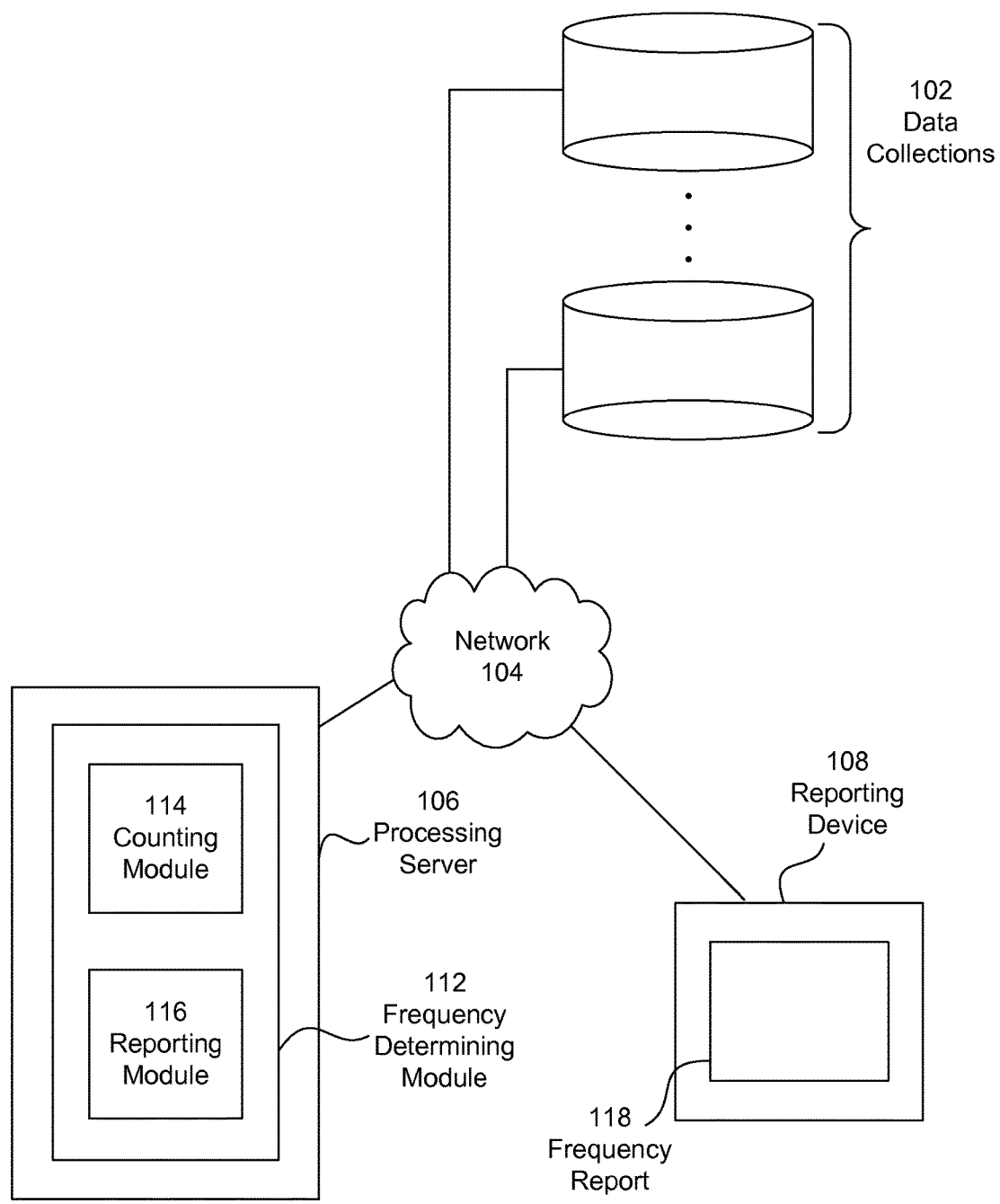
FIG. 1, illustrates a system for analyzing frequently occurring data items in data collections, in accordance with an embodiment.

FIG. 1 illustrates a system for determining the most frequent unique items in a collection of data items, according to an embodiment. System 100 includes one or more data collections 102, a processing server 106 and a reporting device 108 that may communicate with each other or other devices (not shown) through network 104. Network 104 may include, but is not limited to, one or more of a local area network, wide area network, or the Internet.

Data collections 102 may physically be located in one or more locations connected to network 104. Each data collection 102 may include one or more databases, log files or other data files. Data collections 102 include data items that may be categorized into a plurality of distinct categories. For example, all data items that have a particular unique value can belong to the same distinct category. Example data items include data from columnar databases, network packet traces, and system log files. In a columnar database, for example, data items from a 'first name' column may be classified to distinct categories based on unique names, e.g., 'John', 'Amit'.

According to an embodiment, data collections 102 can include one or more live data streams. For example, data collections 102 can include incoming packet streams, incoming status codes received by a web server, and the like.

Figure 5:
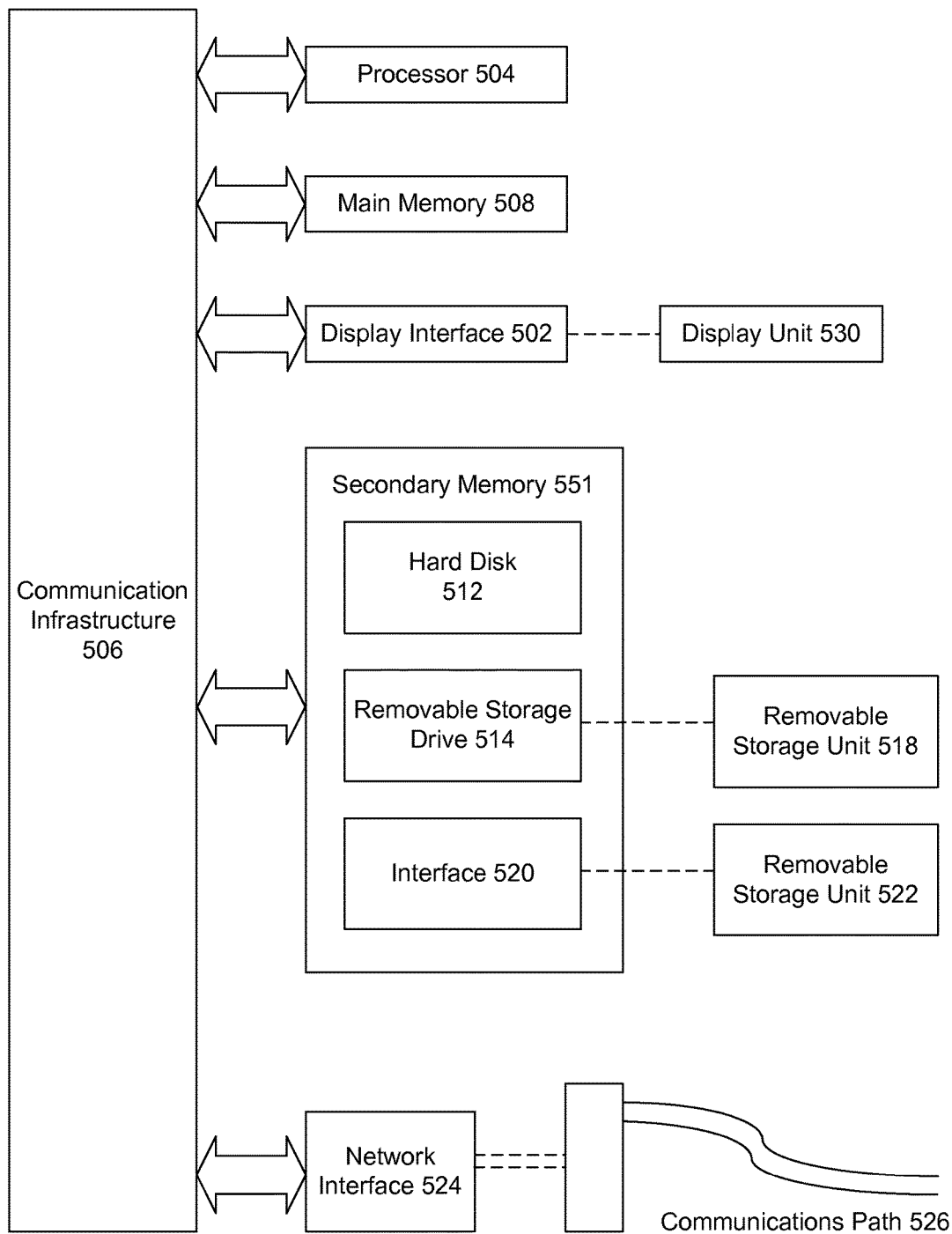
FIG. 5 illustrates a computer system in which embodiments may be executed.

Processing server 106 may be implemented on any computing device, such as, for example, computer system 500 illustrated in FIG. 5, and includes a data item frequency determining module 112 and operates to analyze data collections 102 in order to determine the frequency of occurrence of distinct categories of the data items available in collections 102. According to an embodiment, system 100 may include a plurality of processing servers 106 that perform distributed analyses of the data collections. Frequency determining module 112 may further comprise a counting module 114 and a reporting module 116. Counting module 114 operates to count data items in the respective distinct categories from data collections 102. Reporting module 116 operates to determine the counts and/or ranges applicable to the counts collected by counting module 114.

Reporting device 108 may be coupled directly or indirectly to processing server 106 and may be implemented on any computing device, such as, for example, computer system 500 illustrated in FIG. 5. Reporting device 108 operates to display a frequency report 118 that includes the frequency of occurrence information for the respective distinct categories identified by processing server 106. According to an embodiment, reporting device 108 includes a web browser or other user interface. According to some embodiments, reporting device 108 may include a printer, display, data storage device, and/or other output device.

Figure 2:
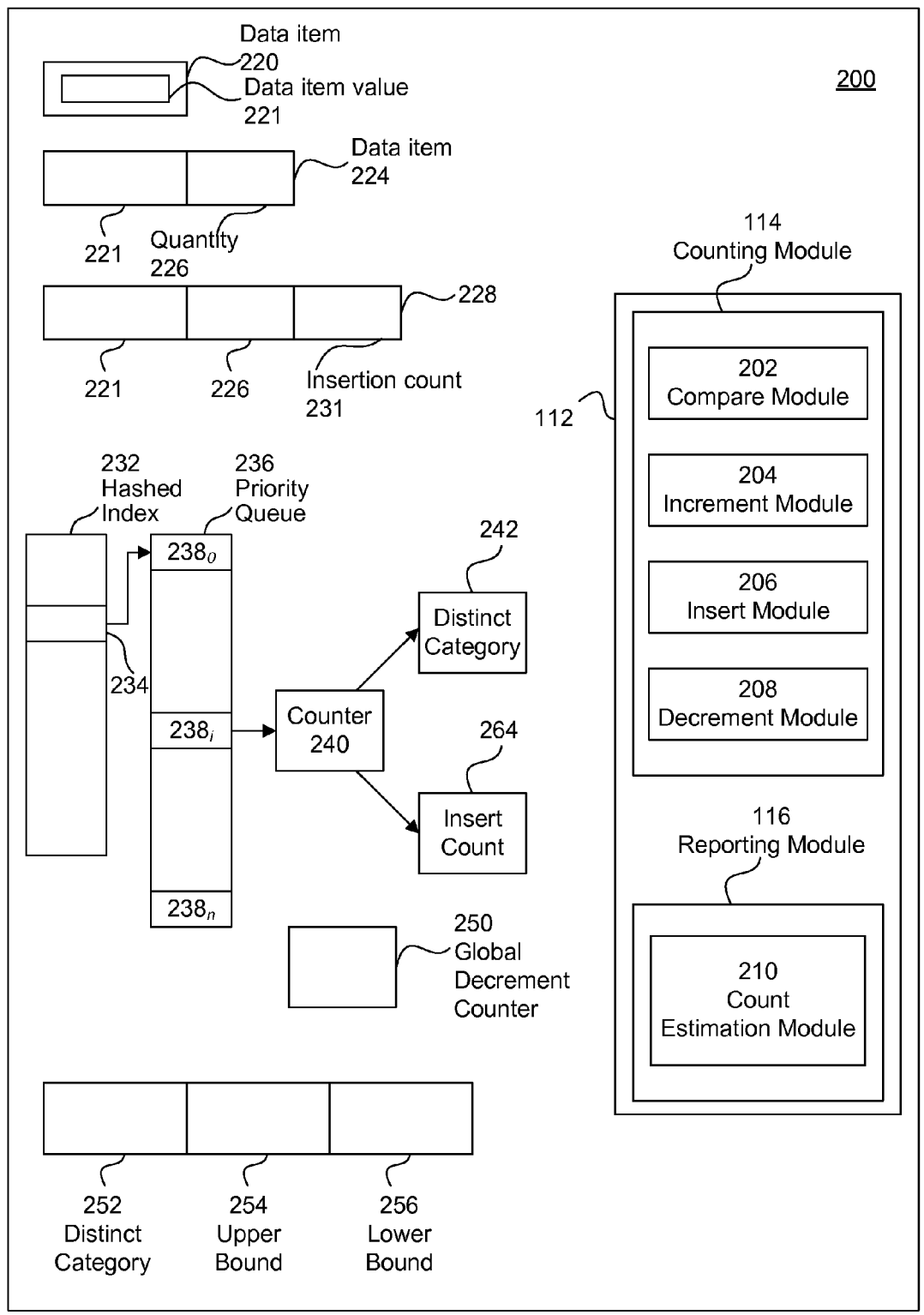
FIG. 2 illustrates a more detailed view of some aspects of the system shown in FIG. 1, in accordance with an embodiment.

FIG. 2 illustrates a more detailed view of frequency determining module 112 and processing server 106, according to an embodiment. FIG. 2 may illustrate components of frequency determining module 112 and related data structures in a memory 200 (e.g., random access memory) of processing server 106.

Data items 220, 224 and 228 represent examples of the different types of data items that may be input to frequency determining module 112. Data item 220 includes at least an item value 221. Item value 221 is the actual value of the data item, e.g., for 'first name' data items, item value 221 may include values such as "John," "Amit," and the like. Data items of the form of data item 220 received as input by frequency determining module 112 can be regarded by frequency determining module 112 as representing one instance of the item value 221.

Data item 224 includes at least an item value 221 and a quantity 226. Quantity 226 represents the number of data items with the same item value 221 that was encountered in a subset of collection 102. According to an embodiment, data item 224 can be used when the most frequent data items are being determined in a distributed manner, and one node passes its counted data items to another to be merged in a hierarchical manner. Data item 224 and data item 228, which is discussed below, are aggregations of data items having the same item value. Data items having the same item value may belong to the same "distinct category." According to an embodiment, each unique item value in the collection of data items is considered a unique data item. According to another embodiment, a particular distinct category may include item values that are the same and also item values that are within some predetermined range or threshold of similarity with respect to each other. For example, a distinct category can include only those data items with an item value of "John," or may include data items with an item value of "John" as well as other similar values, such as, "John Plevyak", "John Smith," and similar names. A classifier (not shown in FIG. 2) may be used to determine if a data item should be classified as belonging to one of a plurality of determined distinct categories. Such a classifier can be configurable as to the level of similarity required of respective data items to be considered as belonging to the same distinct category with respect to each other.

Data item 228 includes at least an item value 221, a quantity 226 associated with item value 221, and an insertion count 231. In some embodiments, an insertion count 231 may be associated with each data item. Insertion count 231 represents a minimum number of data items of that item value that may have preceded the current data item. Insertion count 231 and its use is further described below.

An ordered set, such as priority queue 236, may be used to maintain some of the distinct categories and their respective counters. Priority queue 236 may be of variable size, but may have a predetermined maximum size or maximum number of entries associated with it. By limiting the size of priority queue 236, the memory consumed for analyzing the data item collections may be limited to some known maximum amount. Priority queue 236 may include n entries $238_0 \ldots 238_i \ldots 238_n$ and each entry, such as entry $238_i$, includes, or is associated with a counter 240 representing a quantity of a particular distinct category of data items associated with that entry. In some embodiments, entry $238_i$ may also be associated with a stored distinct category 242 indicating the particular distinct category of data items associated with the entry and/or an insertion count 264 associated with the distinct category associated with the entry. As noted above, and also as described below, insertion count 264 represents a minimum count of the data items of the corresponding distinct category. Priority queue 236 may be arranged according to increasing values of counter 240. Any operation, such as insert, delete, increment, decrement, etc., upon priority queue 236 is performed in a manner that maintains the ordering of the priority queue.

A hashed index 232 may be used to access priority queue 236. An application such as frequency determining module 112, or a component thereof, may access one or more entries in priority queue 236 by performing a lookup using hashed index 232 based upon a hashed data item value.

A global decrement counter 250 and associated logic operates to maintain a count of the decrements imposed upon one or more distinct categories in priority queue 236. The operation of global decrement counter 250 is described below with respect to FIGS. 3-4.

Counting module 114 may include a compare module 202, an increment module 204, an insert module 206, and a decrement module 208, according to an embodiment. Compare module 202 operates to compare a received input data item to the priority queue in order to determine whether there is a match with any of the entries currently in the priority queue.

Increment module 204 operates to increment the counter 240 associated with one or more of the entries in the priority queue 236.

Insert module 206 operates to insert a new entry corresponding to a distinct category that is currently not associated with any entry in the priority queue 236.

Decrement module 208 operates to decrement the counter 208 associated with one or more entries in priority queue 236.

Reporting module 116 may include a count estimation module 210. Count estimation module 210 operates to estimate the frequency of one or more distinct categories in priority queue 236. According to an embodiment, the frequency of a distinct category may be estimated with one or more of a lower bound and an upper bound. According to another embodiment, the frequency of a distinct category may be returned either as a lower bound or upper bound, or as a count without an indication whether the count corresponds to a lower or upper bound.

The output of the frequency determining module 112 may include records and/or entries including a distinct category 252, an upper bound 254, and a lower bound 256.

Figure 3:
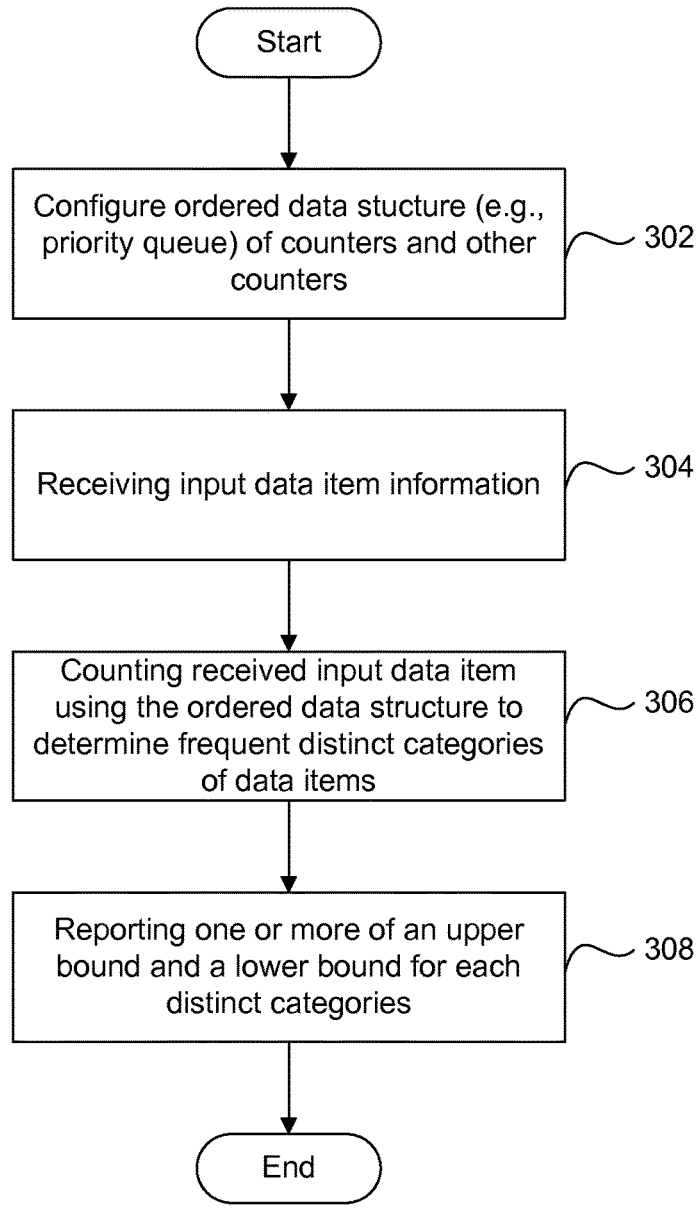
FIG. 3 illustrates a flowchart of a method for analyzing frequently occurring data items in data collections, according to an embodiment.

FIG. 3 illustrates a flowchart of a method 300 for analyzing most frequently occurring data items in data collections, according to an embodiment. According to an embodiment, method 300 includes steps 302-308. Method 300 may not require all of the steps 302-308, and/or may not require that steps 302-308 are performed in the order shown. Method 300 may be performed, for example, by frequency determining module 112 and one or more of its components, counting module 114 and reporting module 116.

At step 302, data structures including an ordered set to maintain counters corresponding to distinct categories, are created. According to an embodiment, a priority queue is created to store the counters for the distinct categories to be counted. The priority queue may be of a fixed size, or may be of a variable size with a defined maximum size. The size of the priority queue may be configurable. The priority queue, such as priority queue 236 shown in FIG. 2, may be implemented as, for example, a table, a list, a linked list, a heap, an array, a stack, a tree, or other such data structure that allows a priority (e.g., an ordering value) to be associated with each entry and to maintain an ordering based upon the priority. According to an embodiment, priority queue 236 is implemented as a linked list with counters configured to store relative counts. A linked-list with relative counts may yield performance advantages for unit count elements (e.g. distinct categories) at the root of a merge tree and when the elements are smoothly dispersed at the other nodes because they can be updated in count sorted order which makes it relatively unlikely that an element will move past more than a single element. Minimizing or reducing the likelihood of elements moving more than one position in the ordered set may yield improved performance, for example, by reducing the amount of re-ordering to be performed upon elements in the ordered set.

In addition to the priority queue, according to an embodiment, an index, such as hashed index 232 may be created. The index may be used to access particular entries in the priority queue. A hashed index may be used due to its efficiency, where a data item is hashed to determine a hashed value which is then used to access the hashed table. The matching hashed table entry may include a pointer to the corresponding entry in the priority queue.

Each entry in the priority queue may include, or be associated with, a distinct category of data items and a counter associated with the distinct category. In another embodiment, an entry in the priority queue can include more than one distinct category with the same count. Associating distinct categories with the same count values to a single entry in the priority queue yields a property that a unit increment (e.g., +1) can only result in an entry moving by one position (although over many elements with the same count). This also gives the algorithm unit cost per element for unit count elements at the leaves of a merge tree used to combine obtained results. In some embodiments, an insertion count may also be included in, or be associated with some or all of the entries. In one embodiment, a priority queue entry may itself have these values stored. In another embodiment, the counter and/or the particular distinct category or insertion count may be associated with the entry by a pointer.

In addition to the ordered set, a global counter, such as global decrement counter 250, is created to maintain a running count of the decrements performed upon entries of the priority queue of counters. Further details of the data structures described above are provided in the description of the other steps of method 300.

At step 304, data item input is received to be processed. According to an embodiment, the input may be received by reading one or more files of data item collections, such as data item collections 102. In other embodiments, the input data items may be received from a live stream of data items read at an interface. For example, a live stream of data items to be analyzed may be obtained by monitoring for status messages returned for various web server operations, and/or by monitoring incoming packets at one or more interfaces. In yet other embodiments, the input data may be data items that include aggregations of data items from one or more other processing servers, to be merged with the data items processed at the current processing server. Data items 220, 224, and 228, represent some of the different types of input data items that may be received.

At step 306, the counting of the received data item is performed using the ordered set, e.g., the created priority queue. According to an embodiment, the counting determines a distinct category to which the input data item belongs, and if a matching entry exists, the counter of that entry is incremented. The counter is incremented by a quantity that is associated with the input data item.

According to an embodiment, the quantity associated explicitly or implicitly with an input data item is 1, This corresponds to having each occurrence of individual data items being input to the frequency determining module. For example, when inputting each row of a columnar database of values, or inputting each row in a log file, there may not be a need to associate any number other than 1 with the data item.

According to another embodiment, a quantity greater than 1 may be associated with an input data item. The quantity, as described above, represents a number of data items encountered that belong to the distinct category indicated in the input data item. Aggregated input data items may be received from other processing nodes that may have independently and/or in parallel determined the frequently occurring data items in respective data collections or respective portions of the same data collection. Such aggregated data items received from other processing servers may be merged using the priority queue of counters to determine an overall set of frequently occurring data items for the entire data collection or set of data collections.

According to an embodiment, the frequency determination may include distributed determination of occurrence frequencies at separate computing nodes and/or separate processes. The separately determined distinct categories and corresponding counts can be hierarchically aggregated (e.g., merged) at successive nodes in accordance with a tree, which may be referred to as a "merge tree". The leaf nodes initially receive and count distinct category data items. Aggregated distinct category counts from child nodes are then successively merged using respective ordered sets at each parent node, and a final ordering of the distinct categories and their respective counts are obtained at the root of the merge tree.

According to an embodiment, for each distinct category data item received from a lower node, the count, the insertion count, and a total decrement count may be determined. Where the values computed at separate nodes or separate processes are combined, efficiency improvements can be derived from encoding the values passed so that they are relative to the global decrement counter of the nodes from which they are arriving. To this end, when passing a count of a distinct category up to a higher level node in the merge tree, a second value passed to the higher level node is set to the global decrement count of the node minus the difference between the upper bound and the lower bound. When distinct categories are inserted into the respective ordered sets at each level, this second value passed up from a lower node may be added into the existing insertion count as well as the existing count at the node (it is noted that, because the lower bound is equal, in part, to the count minus the increment count that the actual value of what is added does not make a difference with respect to the lower bound). A node receiving distinct category data from lower node(s) may adjust for this relative encoding by determining the upper bound by removing the contribution(s) of the incoming global decrement counts of lower nodes as well as the contribution(s) of the incoming increment count(s) by subtracting twice the increment count. By having lower level nodes pass their distinct categories and associated counts in the manner described, embodiments avoid the memory overhead of maintaining decrement count values for each node, and, moreover, can receive distinct category counts from lower nodes in any order. Counting is further described below in relation to FIG. 4.

At step 308, reporting of the frequently occurring data items is performed. The reporting may include outputting a listing of information regarding one or more of the distinct categories associated with the data collection to a display device (e.g., command line user interface, graphical user interface, web browser, etc.), to a storage device (e.g., memory, hard disk, etc.) as one or more files, to a printer, or to another application, which may use the information for further processing. According to an embodiment, reporting module 116 may generate a frequency report 118 which is displayed, printed, and/or stored by reporting device 108.

Subsequent to the counting step, the entries or data items that are still associated with the priority queue are considered as the most frequently occurring distinct categories of data items in the one or more collections that were analyzed. As described above, and also below in relation to FIG. 4, only a subset of the distinct categories of data items available in the analyzed collections are in the priority queue at the end of the counting step. The reporting may include determining, for respective entries in the priority queue, the distinct category, and one or more of a counter value, a lower bound, and an upper bound of the number of data items counter for that distinct category.

According to an embodiment, for a selected distinct category, a lower bound may be determined at least as the sum of the value of the corresponding counter and the current value of the global decrement counter. According to some embodiments, such as when aggregated input data items were considered, the above sum may be adjusted by subtracting the insertion count for the corresponding distinct category. As described above, the insertion count represents the value of the global decrement counter at the time the distinct category was last inserted into the priority queue.

An upper bound may be determined as the sum of the value of the corresponding counter and the current value of the global decrement counter.

Figure 4:
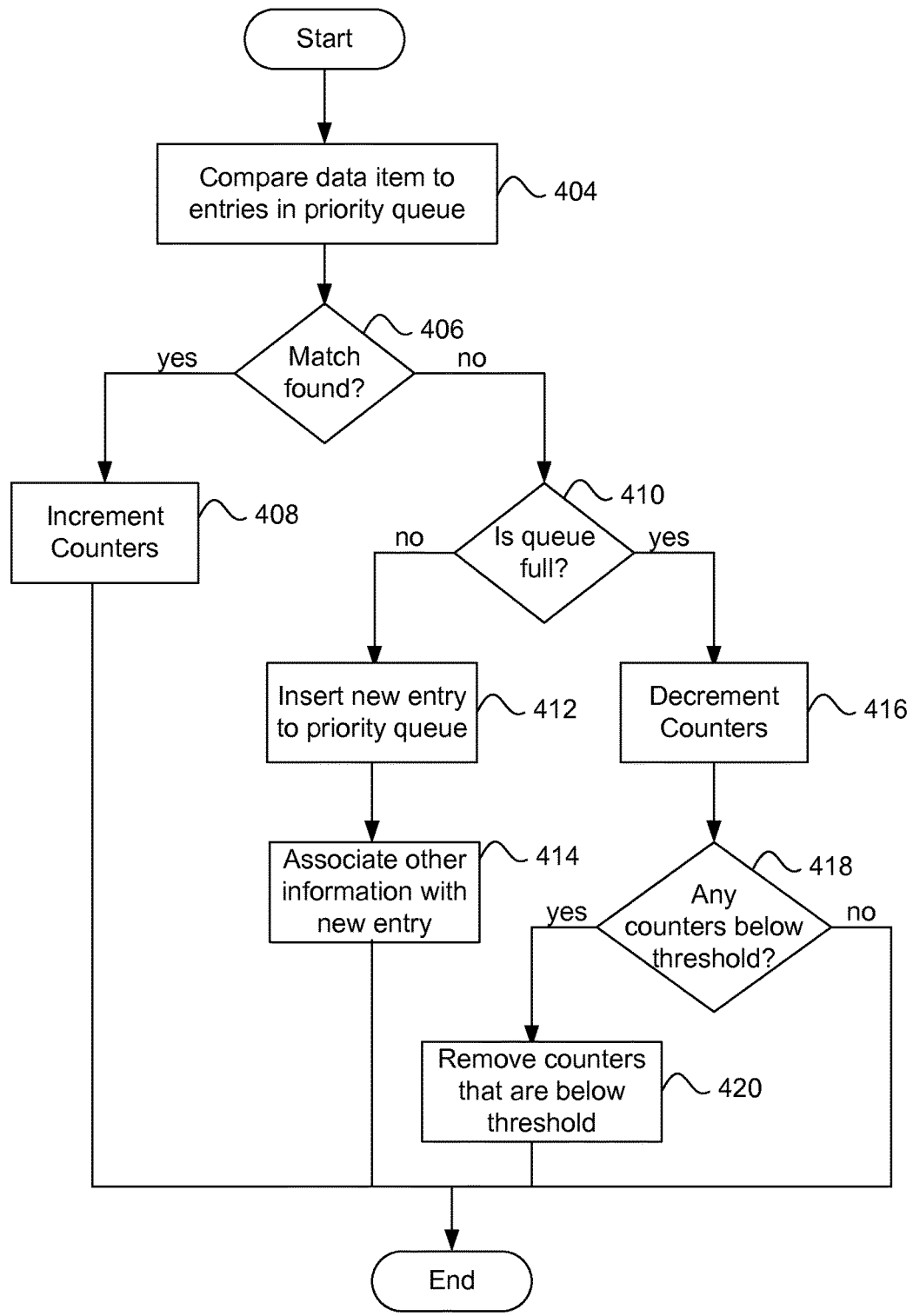
FIG. 4 illustrates a flowchart of a method for counting data items using an ordered set, according to an embodiment.

FIG. 4 illustrates a flowchart of a method 400 for counting data items using a priority queue, according to an embodiment. According to an embodiment, method 400 may be used in performing step 306 discussed above. Method 400 may not require that all steps 404-420 are performed, and may not require that the steps 404-420 are performed in the shown order.

At step 404, the input data item is compared to the ordered set to determine whether a match exists. According to an embodiment, the input data item may be a data item representing a single occurrence of that item value or an aggregated data item representing an aggregation of occurrences of that data item value. Upon receipt a quantity of occurrences is associated with the received data item. For data items representing a single occurrence, even when the data item itself does not include a quantity of the associated occurrences, a value of 1 may be associated with that data item. Otherwise, if the data item includes a quantity of the associated occurrences, then that quantity is associated with the input data item for further processing.

Comparison of the input data item to the priority queue may be performed in any manner. According to an embodiment, the input data item value is hashed, according to a predetermined hash function, and a hashed index is looked up based upon the hashed value of the input data item. If the hashed lookup fails, then no match for the current input data item was found in the priority queue. If the hashed lookup is successful, then a match has been found.

Based upon the comparison, at step 406, it is determined whether a match has been found or not.

If a match was found, then at step 408, one or more counters of the priority queue are incremented. According to an embodiment, the counter of the matching entry is incremented by an amount based upon the quantity associated with the current input data item. Based upon the current input data item, the increment may be a unit increment or greater than 1, As noted above, the priority queue ordering may be adjusted upon the increment in order to maintain the lowest-to-highest ordering of the priority queue.

When a counter in the priority queue is incremented by 1, then, in order to maintain the priority ordering, that incremented counter may move at most one location in the queue. However, increments by values greater than 1, may cause those counters to be moved by more than one location in the queue. Therefore, different computing costs may be associated with incrementing by 1 or incrementing by larger values.

Otherwise, if at step 406, it is determined that no match was found for the current data item, method 400 proceeds to step 410. At step 410, it is determined whether the priority queue is full, e.g., whether it has reached its maximum permissible size. The maximum size for the priority queue may be specified as a configuration parameter.

If the priority queue is not full, then at step 412, a new entry is inserted to the priority queue. The position of the inserted entry in the priority queue may be determined based upon the quantity associated with that entry, so that the ordering of the priority queue is maintained. The inserted entry has, associated with it or included therein, a counter value and a distinct category. It should be noted that inserting of a distinct category with a counter value of 1 occurs at the front of the priority queue, and therefore has constant cost.

At step 414, according to some embodiments, other information, such as, but not limited to, an insertion count, may be associated with the inserted entry. The insertion count includes the value of the global decrement counter at the time the entry is inserted in the priority queue.

If, at step 410, it is determined that the priority queue is full, then method 400 proceeds to step 416. Method 400 arrives at step 416 for any input data item that is not currently stored in the priority queue when the queue is full. At step 416, one or more counters are decremented by an amount corresponding to the quantity associated with the input data item. According to an embodiment, each of the counters in the priority queue is decremented by the quantity associated with the input data item. Moreover, the global decrement counter is incremented by the quantity associated with the input data item.

According to an embodiment, as described above, in order to improve efficiency, each counter value in the priority queue is stored as an offset from the previous value. When stored in this manner, the updating in step 416 may be performed by decrementing the counter value of the lowest counter (e.g., the first element) of the priority queue.

At step 418, it is determined whether any counters have dropped below a threshold value. According to an embodiment, the threshold may be set to 1, For example, one or more counters may drop to a value below 1 due to the decrementing in step 416.

If it is determined at step 418, that one or more counters have dropped to less than the threshold, then at step 420, those entries with the counters below the threshold are removed from the priority queue. Note that when one or more entries are removed from the priority queue at step 420, the priority queue is no longer full.

FIG. 5 illustrates an example computer 500 in which the embodiments described herein, or portions thereof, may be implemented as computer-readable code. For example, frequency determining module 112 or any of its modules, illustrated in FIG. 1, can be executed on one or more computer systems 500 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme. Computer system 500 may also include display interface 502 and display unit 530.

Computer system 500 also includes a main memory 508, for example, random access memory (RAM), and may also include a secondary memory 551. Secondary memory 551 may include, for example, a hard disk drive 512, and removable storage drive 514. Removable storage drive 514 may include a floppy disk drive, a magnetic tape drive, an optical disk drive, a flash memory drive, or the like. The removable storage drive 514 reads from and/or writes to a removable storage unit 518 in a well-known manner. Removable storage unit 518 may include a floppy disk, magnetic tape, optical disk, flash memory drive, etc. which is read by and written to by removable storage drive 514. As will be appreciated by persons skilled in the relevant art, removable storage unit 518 includes a computer readable storage medium having stored thereon computer software and/or data.

In alternative implementations, secondary memory 551 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface (also referred to as "network interface") 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer storage medium" and "computer readable storage medium" are used to generally refer to non-transitory media such as removable storage unit 518, removable storage unit 522, and a hard disk installed in hard disk drive 512. Computer storage medium and computer readable storage medium may also refer to memories, such as main memory 508 and secondary memory 551, which may be memory semiconductors (e.g. DRAMs, etc.).

Computer programs (also called computer control logic) are stored in main memory 508 and/or secondary memory 551. Computer programs may also be received via communications interface 524. Such computer programs, when executed, enable computer system 500 to implement the embodiments described herein. In particular, the computer programs, when executed, enable processor device 504 to implement the processes of the embodiments, such as the stages in the methods illustrated by flowcharts of FIGS. 3-4, described above. Accordingly, such computer programs represent controllers of computer system 500. Where an embodiment is implemented using software, the software may be stored in a computer storage medium and loaded into computer system 500 using removable storage drive 514, interface 520, and hard disk drive 512, or communications interface 524.

Embodiments of the invention also may be directed to computer program products including software stored on any computer readable storage medium. Such software, when executed in one or more data processing devices, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the embodiment of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described illustrative embodiments, but should be defined only in accordance with the following claims and their equivalents.

What is claimed is:

1. A method for determining frequently occurring data items in a data set, comprising:
    counting, at a node in a merge tree, occurrences of data items in distinct categories using an ordered set of counters configured to store respective counts, the counting including decrementing a subset of the counters and incrementing a global decrement counter when one of the data items fails to match at least one of the distinct categories associated with the counters of the ordered set and when the ordered set is full;
    storing the ordered set of counters in a queue; and
    sending a count of occurrences of data items in the distinct categories from the ordered set of counters and the global decrement counter to a higher level node in the merge tree.

2. The method of claim 1, wherein the count of occurrences of data items in the distinct categories is represented relative to the count of the global decrement counter.

3. The method of claim 1, further comprising: receiving, at the node in the merge tree, an external count of occurrences of data items in the distinct categories from a lower level node in the merge tree.

4. The method of claim 3, further comprising:
    updating a counter associated with the distinct category associated with the received external count; and
    reordering the counter within the ordered set of counters based on the updated count.

5. The method of claim 1, wherein a counter of the ordered set of counters is associated with a plurality of distinct categories.

6. The method of claim 1, wherein the node in the merge tree is a first node, and the method further comprises:
    receiving, at a root node in the merge tree, counts of occurrences of data items in the distinct categories from the first node and one or more second nodes.

7. The method of claim 6, further comprising:
    updating, at the root node, root counters associated with the distinct categories associated with the counts received from the first node and one or more second nodes;
    in response to updating the root counters, reordering, at the root node, the root counters within an ordered set of counters based on an updated count for each root counter; and
    outputting the updated counts for each root counter, wherein the updated counts for each root counter represent a count of occurrences of data items in the distinct categories for the data set.

8. A non-transitory, computer-readable medium storing instructions operable when executed to cause at least one processor to perform operations comprising:

counting, at a node in a merge tree, occurrences of data items in distinct categories using an ordered set of counters configured to store respective counts, the counting including decrementing a subset of the counters and incrementing a global decrement counter when one of the data items fails to match at least one of the distinct categories associated with the counters of the ordered set and when the ordered set is full;

storing the ordered set of counters in a queue; and sending a count of occurrences of data items in the distinct categories from the ordered set of counters and the global decrement counter to a higher level node in the merge tree.

9. The computer-readable medium of claim 8, wherein the count of occurrences of data items in the distinct categories is represented relative to the count of the global decrement counter.

10. The computer-readable medium of claim 8, further comprising: receiving, at the node in the merge tree, an external count of occurrences of data items in the distinct categories from a lower level node in the merge tree.

11. The computer-readable medium of claim 10, further comprising:

updating a counter associated with the distinct category associated with the received external count; and reordering the counter within the ordered set of counters based on the updated count.

12. The computer-readable medium of claim 8, wherein a counter of the ordered set of counters is associated with a plurality of distinct categories.

13. The computer-readable medium of claim 8, wherein the node in the merge tree is a first node, and the computer-readable medium further comprises:

receiving, at a root node in the merge tree, counts of occurrences of data items in the distinct categories from the first node and one or more second nodes.

14. The computer-readable medium of claim 13, further comprising:

updating, at the root node, root counters associated with the distinct categories associated with the counts received from the first node and one or more second nodes;

in response to updating the root counters, reordering, at the root node, the root counters within an ordered set of counters based on an updated count for each root counter; and outputting the updated counts for each root counter, wherein the updated counts for each root counter represent a count of occurrences of data items in the distinct categories for the data set.

15. A system comprising:

memory for storing data; and one or more processors operable to access the memory and perform operations comprising:

counting, at a node in a merge tree, occurrences of data items in distinct categories using an ordered set of counters configured to store respective counts, the counting including decrementing a subset of the counters and incrementing a global decrement counter when one of the data items fails to match at least one of the distinct categories associated with the counters of the ordered set and when the ordered set is full;

storing the ordered set of counters in a queue; and sending a count of occurrences of data items in the distinct categories from the ordered set of counters and the global decrement counter to a higher level node in the merge tree.

16. The method of claim 15, wherein the count of occurrences of data items in the distinct categories is represented relative to the count of the global decrement counter.

17. The system of claim 15, the operations further comprising: receiving, at the node in the merge tree, an external count of occurrences of data items in the distinct categories from a lower level node in the merge tree.

18. The system of claim 17, the operations further comprising:

updating a counter associated with the distinct category associated with the received external count; and reordering the counter within the ordered set of counters based on the updated count.

19. The system of claim 15, wherein a counter of the ordered set of counters is associated with a plurality of distinct categories.

20. The system of claim 15, wherein the node in the merge tree is a first node, and the operations further comprise:

receiving, at a root node in the merge tree, counts of occurrences of data items in the distinct categories from the first node and one or more second nodes.

* * * * *